Patented Aug. 12, 1952

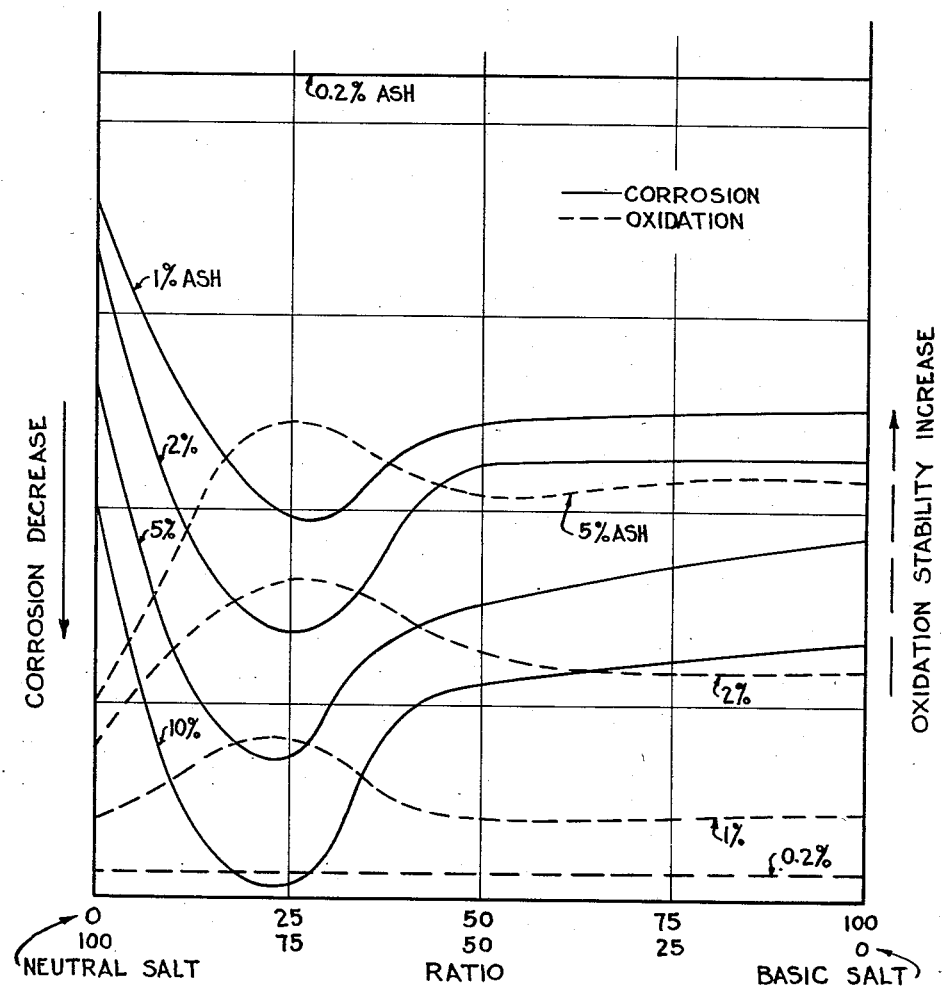
FIG. I
INVENTORS: WALTER GASSER
PAUL R. VAN ESS
BY THEIR ATTORNEY: James Todorovic

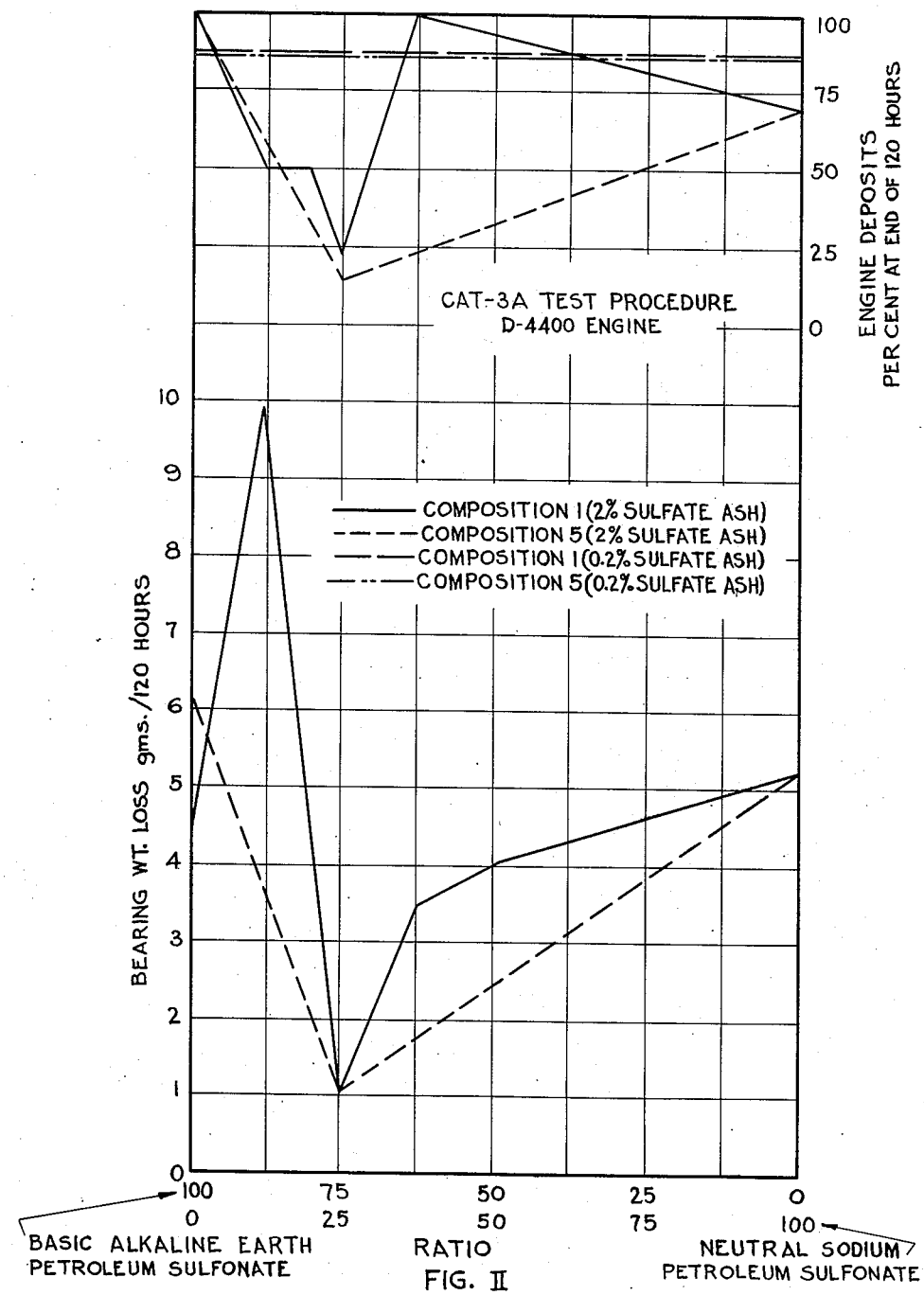

2,606,872

UNITED STATES PATENT OFFICE 2,606,872

LUBRICATING COMPOSITION

Walter Gasser and Paul R. Van Ess, Berkeley, Calif., assignors to Shell Development Company, San Francisco, Calif., a corporation of Delaware Application December 6, 1948, Serial No. 63,728

11 Claims. (Cl. 252—33)

This invention relates to compounded lubricating compositions, suitable for use in substantially all types of industrial equipment, and particularly in engines operating under adverse conditions. Specifically, this invention pertains to engine lubricants compounded with an ash-forming improving agent in amounts above a critical lower limit so as to impart to said lubricants outstanding lubricating properties.

It is well known in the art that lubricants whether doped or undoped deteriorate and form corrosive bodies, sludge, varnish and other contaminants in engines, whether these engines are operated under mild conditions (as characterized by low temperature and reduced load) or under extreme pressure conditions (as characterized by high temperature, high speeds, high loads, and the like). Under either condition of operation, factors are encountered which contribute to oil deterioration with the resultant formation of products of contamination which cause corrosion, sludge, varnish and lacquer formations; this inevitably results in sticking, wearing, scuffing, scoring and even seizing of metal parts of such engines.

Engine fouling and wear under conditions of high temperature operation is generally attributed to oil deterioration caused by oxidation. Lubricating oils under such conditions tend to oxidize rapidly and to form corrosive bodies and carbonaceous materials which cause scratching or scuffing of movable metal parts, sticking of valves, piston rings, and the like. A condition which may accentuate and accelerate deterioration of lubricants is the presence of small amounts of moisture existing or formed in lubricants, or of blow-by vapors from fuel (especially if they are high sulfur fuels), which vapors enter the lubricating system and form harmful deterioration products. The close tolerances to which engine parts are machined, as well as the restricted clearances between various engine parts, aggravate this condition and aid in the deterioration of the lubricant. This is due to the fact that varnish and/or lacquer coatings on various engine parts, such as rings, valves, pistons, cylinder walls, etc., caused by oil deterioration, diminish side clearances and act as heat insulators; both conditions cause increased oil temperature, resulting in its further breakdown.

Lacquer formations are generally attributed to oil oxidation, and are hard resinous materials having a tendency to adhere to metal surfaces and to form thereon a hard deposit which blisters and, on chipping, acts as an abrasive capable of scratching surfaces and blocking oil passages.

High temperature and pressure oil decomposition products are highly corrosive, especially towards alloys, such as the copper-lead, cadmium-silver and like alloys. Other factors can also account for engine corrosion, but they are complex in nature and varied in origin. Thus, acids, found or formed in oils or fuels, may attack and corrode copper-lead bearings or the like. At elevated temperatures alloyed bearings are adversely affected by sulfur derived from certain of its compounds or found free in an oil or fuel. Under these conditions sulfur can produce hard, brittle, black deposits particularly on copper-lead or silver bearings. Such deposits may adhere and reduce the bearing clearance or they may break out and gouge out the bearing; in either event this results in bearing failure.

To withstand wear and protect bearing surfaces under the above stringent operating conditions, lubricants must possess so-called extreme pressure properties, whereby the lubricant, by forming a film of low shear strength by chemical action or physical adsorption on the contact points, prevents metal welding and seizure. Generally, lubricants are quite incapable of maintaining a continuous protective lubricating film between contacting metal surfaces, unless fortified with special agents possessing extreme pressuring properties. However, such extreme pressure agents when added in amounts to be effective generally increase engine deposits and cause wear because of their corrosive nature and activity.

Although oil oxidation is minimized in low temperature operation, engine fouling from other causes is very serious and aggravating. Engine deposits and sludge under these conditions are generally associated with oil insolubles originating from incomplete combustion of the fuel. If high sulfur fuels are used, this condition becomes extremely serious, especially if small quantities of water and other contaminants enter the system. Low temperature deposit formations are referred to as mayonnaise emulsions which contribute to engine fouling and wear. The presence of mineral matter and carbonaceous materials also causes wear and contributes toward accelerating corrosivity of metal parts.

To improve the lubricating properties of mineral lubricating oils and synthetic lubricants it has become the practice to blend with or add to the various lubricants one or more addition agents which have the property of stabilizing and inhibiting deterioration of lubricants and impart certain beneficial properties to them. Thus, additives have been specifically developed which have the property of inhibiting corrosion of alloyed bearings as utilized in automotive, diesel and aircraft engines. Additives have also been developed which possess the property of modifying the carbonaceous matter formed by deterioration of lubricants, so as to be easily removed. Other additives have been developed for the purpose of acting as detergents in lubricants in order to assist in the removal of soot, sludge, varnish, lacquer and the like. Detergents due to their cleaning and dispersing properties prevent the building of deleterious materials on surface and if formed assist in removing them. Still other additives agents have the properties of inhibiting wear, oxidation, impart oiliness, extreme pressure properties, act as solubilizers and the like.

It is an object of this invention to improve the lubricating properties of various lubricating bases by addition thereto of a substantial amount of improving agent and/or agents. Another object of this invention is to provide lubricants with dopes in such concentrations so as to obtain a stable, corrosion-resistant product even when subjected to the most adverse operating conditions. Still another object of this invention is to provide a highly effective detergent lubricant capable of preventing ringsticking as well as sticking or seizure of other engine parts. It is also an object of this invention to provide an improved lubricant capable of preventing wear, scuffing, scratching and the like. Still another object of this invention is to provide a stable, non-corrosive, highly detergent heavy duty lubricant suitable for use under varied and adverse conditions. Other objects of this invention will appear as the description proceeds.

The art discloses the addition of dopes and improving agents to lubricants in rather very minor amounts particularly in the case of lubricants compounded with a metallic compound. This has been done apparently due to the belief that because of the pronounced activity of the additives or dopes, these latter if used in high concentrations would become contaminants rather than improving agents and therefore would act as abrasives, wear, sludge, lacquer corrosion promoters, and the like. Because of this and also because of the physical modifying effects dopes have on base lubricants, such as increased viscosity and the like, the addition of large quantities of dopes to lubricants has been frowned upon.

The addition of oil dopes in very minor amounts has been rigorously adhered to in the art; for example, U. S. Patents 2,375,222 and 2,410,652 state that any additives, such as detergents, when incorporated in lubricants should be in such small amounts as to leave substantially a non-volatile ash upon combustion, and that, at most, the total ash content should not exceed about 0.25% (determined as sulfate ash) and preferably should be below about 0.2% ash by weight. Furthermore, U. S. Patent 2,416,192 discloses that the maximum amount of metallic detergent dope which can be added to lubricants with safety should not be in excess of 0.42% ash, calculated as sulfate ash. Also, the U. S. Navy specifications for lubricanting oils suitable for diesel engines and the like impose a rigid limitation as to the maximum ash allowable in lubricants. Thus, Navy Department Specifications 14–0–13a places as a maximum allowable ash for diesel lubricants at 0.6% ash by weight. Lubricants containing an ash content above 0.6% ash heretofore have been regarded as unsuited because of the danger of increased corrosion, wear, etc., particularly in the case where metallic salts are used as the dopes.

The desirability of keeping the ash content of lubricants at a minimum, namely, below 0.6% and preferably below 0.2%, was considered to be a critical limitation which appeared to be substantiated by facts. Thus, within the ranges actually tested heretofore, numerous performance tests such as the CRC tests L1, L2, L3, L4 and L5, as well as actual field and bench tests, disclosed that as the ash content increased within the low concentrations tried heretofore, corrosivity also increased at an alarming rate. For example, it was shown that by increasing the concentration of a metallic detergent in a lubrican from 0.2% to about 0.6% weight ash, corrosivity increased by over 300%. The addition of corrosion and/or oxidation inhibitors had little effect on stabilizing or inhibiting corrosivity due to increased amounts of ash-forming dopes present. Since such general alarming results were consistently obtained with lubricants containing ash-forming additives in concentrations approaching 0.6%, the practice of doping lubricants with such additives in very low concentrations, such as around about 0.2% weight ash, or even below, has been rigorously adhered to.

It has now been discovered that improved engine performance can be obtained by doping a base lubricant with a mixture of two oil-soluble metals containing organic salts in critical ratio, one of said metal compounds being basic and the total amount of said metal compounds being used in such large concentrations as to exceed at least 1% calculated on the ash basis. Stated somewhat differently, it has now been discovered that if a base lubricant is doped with two metal-containing organic salts at least a portion of one of them being basic and a portion of the total organic compounds being in the form of neutral salt, and the basic and neutral salts being maintained in critical ratios of from 2:8 to 4:6 and preferably of from 3:7 of neutral to basic salt, and when they are present in excess of 1% calculated on the ash basis, minimum corrosivity and maximum stability are obtained, which beneficial properties are enhanced as the concentration is increased up to about 50% calculated on the ash basis or up to such large concentrations which by virtue of increasing the viscosity characteristics of the base lubricant up to such a point as to render it unsuitable for engine lubrication or for other industrial equipment. Below 1% concentrations calculated as on an ash basis this phenomenon is not observed as can be seen by reference to Figure I, which also graphically represents the essence of the present invention. The solid lines in this figure represent the degree of corrosivity while the dotted lines represent oxidation stability with respect to ratio and concentration of the additives of this invention. Specifically this figure illustrates that when the ash additives of this invention are incorporated in a base lubricant in desired ratio and concentrations of above 1% calculated on an ash basis, such as in concentrations of 1%, 2%, 5% and 10%, compositions of unexpected stability and corrosion resistance can be obtained. When the additive concentration is below 1% ash, such as 0.2% ash the resulting composition is poor in both stability and corrosion resistance, as can be also noted from this figure.

The term "ash forming materials" comprises such ingredients which if ignited per se or as an oil concentrate, will produce an ash free of carbonaceous matter. If certain metallic salts such as of sodium, calcium, etc., are present, the percentage ash may be expressed as percentage of sulfate ash, while with zinc and aluminum the percentage of ash is expressed as percent oxide ash. This basis of calculation can be accomplished by acidifying the sample tested with dilute sulfuric acid, igniting the sample to free it of carbonaceous matter and expressing the residue as percent sulfate ash. Thus, for example, the following procedure may be followed to determine the amount of ash residue in an oil sample containing a minor amount of calcium petroleum sulfate. A small portion of the sample may be heated in a crucible allowing the combustible material to burn slowly, igniting the residual ash to free it of carbon and adding a few drops of sulfuric acid to convert any reduced calcium sulfide, etc. to sulfate, reigniting and weighing the residue, which is reported as percent sulfate ash. It is therefore to be clearly understood that all values above and henceforth referred to are on the percent ash basis such as percent sulfate ash in the final product and not the percent by weight or volume of a dope concentrate, which can be further diluted or the final percent by weight of a dope in an oil. The above is substantially the method described in the ASTM (ES-43) of 1945.

Broadly stated this invention relates to improving lubricants by addition thereto of a mixture of ash-forming metallic detergents in critical ratios, at least one of them being basic and in amounts exceeding 1% calculated. The neutral and basic detergent salts may be represented respectively by the broad partial general formulas:

$$-X-M \text{ and } -X-M-OH$$

where at least one of the metallic cation portion M of the salt is polyvalent and X is a part of the anionic portion of the salt to which M is linked to form the metallic salt.

*Metal part*

Group I:
  Lithium
  Sodium
  Potassium
  Rubidium
  Cesium
  Copper
  Silver
Group II:
  Beryllium
  Magnesium
  Calcium
  Zinc
  Strontium
  Cadmium
  Barium
Group III:
  Aluminum
  Gallium
  Indium
  Thallium Group IV:
  Titanium
  Zirconium
  Tin
  Lead
Group V:
  Vanadium
  Antimony
  Bismuth
Group VI:
  Chromium
  Molybdenum
  Tungsten
Group VII.—Manganese
Group VIII:
  Iron
  Cobalt
  Nickel

*Acid forming part or anion part*

I. Aromatic acids, represented by the general formula $$X'_m-Ar-X_n-(Z)_y$$

wherein Ar is an aromatic nucleus; X' and X may be non-polar or polar radicals attached to the aryl nucleus; Z is a carboxylic acid group such as CYYH wherein either or both Y's may be oxygen, sulfur, selenium or tellurium, said acid being attached directly to the aryl nucleus or linked to it through X; $m$ may be zero or an integer of from 1 to 3; $n$ may be zero or one and $y$ may be an integer of 1 or 2. Representative acids are:

Benzoic
Phthalic
Toluic
Xylic
Phenyl fatty acids, e. g.—
  Phenyl acetic to phenyl stearic acids
  Benzylacetic to benzyl stearic acids
  Cinnamic acid
  Salicylic acid
  Mandelic acid
  Phenyl glyoxylic
  Benzoyl propionic acid
  Phenyl laevulunic acid
  Phenyl alkyl succinic acid
  Benzyl alkyl succinic acid
  Phenyl alkyl glutaric acid
  o-Vinyl benzoic acid
  Phenyl angelic acid
  Naphthoic acid
  Naphthyl stearic acid
  Anthranilic acid
  Mercapto (phenyl, tolyl, xylyl, xenyl, naphthyl anthracyl) fatty acids, e. g.—
    Phenyl mercapto acetic to phenyl mercapto stearic acid
    Ethyl mercapto phenyl acetic acid
    Aryl mercapto benzene-4-carboxylic acid II. Organic compounds containing an inorganic acid:

A. Benzene sulfonic acid
  Toluene sulfonic acid
  Triisopropyl naphthalene sulfonic acid
  Diphenyl sulfonic acid
  Polyalkyl aromatic sulfonic acid, e. g.—
    Polyamyl naphthalene sulfonic acid
    Diwax benzene sulfonic acid
    Xylene sulfonic acid
    Benzene disulfonic acid
    Alkane sulfonic acids, e. g.—
      Amyl
      Octyl
      Nonyl
      Lauryl
      Dodecyl sulfonic acid
  Petroleum sulfonic acids derived from various petroleum fractions, such as—
    Gas oil
    Kerosene
    Light oil
    Turbine oil
    Mineral lubrication oil
    Heavy oil
    Petroleum waxes, e. g.—
      Petrolatum
        Paraffin wax and mixtures of various hydrocarbon fractions
    Wax sulfo salicylic acid
    Diwax naphthalene sulfonic acids, etc.

Petroleum sulfonic acids are produced by treating suitable petroleum hydrocarbon fractions with sulfuric acid. For example, a turbine oil having a Saybolt Universal viscosity at 100° F. of from about 400 to 540 seconds is treated with fuming sulfuric acid, preferably in small increments. After a calculated amount of sulfuric acid has been added to the oil, the sludge which forms is removed and the acid-treated oil containing dissolved oil-soluble sulfuric acid is neutralized with a solution of sodium hydroxide. The aqueous alkali solution is removed from the mixture and the sodium salts of petroleum sulfonic acid extracted with alcohol. The alcohol layer containing the sulfonates can be removed by distillation or by any other suitable means.

Modifications to the above procedure can be made by removing acid sludge after the entire required amount of acid has been added. Also the sulfonic acid can be removed before neutralization rather than after as indicated above. If this is done, it is preferable to give the acid-treated oil a clay treatment so as to remove inorganic esters of sulfuric acid and other impurities so as to prevent formation of inorganic salts. Clays which are particularly suitable are highly adsorbent clays such as Attapulgus clay, floridin, bentonite, bauxite, fuller's earth, etc. Still another modification in preparing pure oil-soluble sulfonates is to add to the sludge-free acid-treated oil a solvent such as benzol, carbon tetrachloride, and the like, and neutralizing said mixture with a caustic solution. The spent caustic solution is removed. The solvent distilled off, leaving a substantially pure sulfonate in oil mixture. The product can be air-blown and dehydrated to remove impurities. Instead of sulfonating a mineral oil alone a small amount of waxy material may be added to obtain a more improved sulfonate. The sulfonic acids may be formed by acidifying the neutralized sulfonate or a particular desired salt of a sulfonic acid may be obtained by double decomposition.

Other oil-soluble organic sulfonic acids may be produced by sulfonating alkyl aromatic hydrocarbons, such as alkyl benzenes, alkyl naphthylenes, alkyl anthracenes, alkyl phenanthrenes, alkyl picenes, alkyl chrysenes, alkyl diphenyls, etc. provided the number of carbon atoms in the alkyl chain or chains is sufficient to render the resulting sulfonic acids and their salts soluble in the base. It is desirable that at least one alkyl radical be relatively long, i. e. contain at least 8 or more carbon atoms, not only because of solubility in oils, but also for the reason that long alkyl chains improve the anti-ringsticking efficiency of the salts formed with the sulfonic acids. Thus, one may produce an aromatic hydrocarbon suitable for the production of highly efficient sulfonic acids by condensing chlorinated paraffin wax, alkyl chlorides such as octyl, decyl, cetyl, etc.; chlorides, fatty alcohols, long-chain olefins such as may be obtained in the cracking of wax, etc., with aromatic hydrocarbons by means of suitable condensing agents such as Friedel-Crafts catalysts, sulfuric acid, phosphorus pentasulfide, phosphoric acid, etc. Sulfonic acids may contain substituent radicals as, for example, paraffin wax substituted naphthalene monosulfonic acids which contain a sulfonic radical attached to one ring of the naphthalene nucleus and a hydroxy or amino radical attached to the other ring.

B. Substituted phosphorus acids containing an organic substituent, e. g. the aromatic acid esters of phosphoric acid, thiophosphoric acids, phosphorous acids and thiophosphorous acids, obtained by reacting $POCl_3$, $P_2O_5$, $PCl_5$, $P_2S_3$, $P_2S_5$, $P_4S_7Br$ with any of the acids of groups I, and II. These inorganic phosphorus compounds may also be reacted with any of the materials listed under group III, as well as esters which may be formed by reacting the alcohols of IV with the acids of group III.

III. Aromatic hydrocarbons:

| A | B |
|---|---|
| Benzene | Alkyl |
| Naphthalene | Hydroxy |
| Anthracene | Amine |
| Phenanthrene | Nitro |
| Diphenyl | Nitroso |
| Diphenyl alkane | Halogen |
| Stilbene and the like | Carboxyl |
|  | Mercaptan, etc. |

C. Aromatic alcohol—
  Benzyl
  Phenyl ethyl
  Dibenzyl
  Tolyl
  Phenyl octyl
  Octadecyl benzyl alcohols, etc.

IV. Phenolic compounds (R—Ar—X—H) wherein Ar is an aryl nucleus, X is O, S, Se, Te and R is a substituent non-polar and/or polar groups.

Phenol
Alkyl phenol
Dibutyl phenol and its thiophenols
Amyl phenol and its thiophenols
Tertiary butyl
p-Tertiary amyl
Octyl
p-Isooctyl
Isobutyl
Nonyl
Cetyl phenols and thiophenols
Alkylamino phenol
Alkyamino naphthol
Catechol
Resorcinol
Pyrogallol All of these compounds may contain substituent groups as listed under III-B and the like. Substituted products are: hydroquinone, quinone, orcinol, phloro-glucinol, cresols, thymol, saligenin, cinnanyl alcohol, methyl phenyl carbinol, eugenol, cardanols, etc. Also the thiophenolic derivatives of these phenolic compounds may be used as well as various reaction products thereof such as obtained by reacting phenolic compounds with: $SCl_2$, $S_2Cl_2$, $H_2S$, ammonium hydrosulfide —$H_2S$, S, $SO_2$ and the like to form sulfide derivatives which may be represented broadly by the formula:

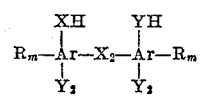

wherein Ar is an aryl nucleus, R is an alkyl, arylalkyl radical and the like, X is O, S, Se or Te and $u$ is an integer of from 1 to 4, and Y may be a polar radical such as listed under III-B either or both M and $x$ on the Ar group may be zero or an integer of 1 or 2.

Phenolic condensation products may also be formed by reacting products under group IV with aldehydes of the aliphatic, aromatic or cyclic type, specifically represented by formaldehyde, acetaldehyde, crotonaldehyde, butyraldehyde, benzaldehyde, furaldehyde and the like. The condensation reaction is carried out at rather an elevated temperature using an acid or basic catalyst. Typical condensation reaction products may be formed between Octyl phenol-formaldehyde
Octyl phenol-acetaldehyde
Isooctyl phenol-acetaldehyde
Isooctyl phenol-crotonaldehyde
Octyl phenol-benzaldehyde
Octyl phenol-furfuraldehyde
Octyl thiophenol-furfuraldehyde
Octyl thiophenol-formaldehyde
Amyl phenol-formaldehyde
Amyl phenol-furfuraldehyde V. Aldehydes:
A. Aromatic—
　Benzaldehyde
　Cinnamaldehyde
　Salicylaldehyde
　Naphthaldehyde
　Vanillin, etc.
A. Aromatic ketones—
　Acetophenone
　Propiophenone
　Dibenzyl ketone
　Benzyl phenyl ketone
　Benzophenone and the like The salts may be formed by saponifying any of the acids or acid-forming materials referred to above with the cationic agents listed under groups I to VIII of the cationic groups to form either the normal or basic salts, the composition of the present invention, however, containing a mixture of both the normal and basic salts in critical ratios and high concentration.

The following table gives typical examples of preferred mixtures of normal and basic salts which give outstanding results when used in specific ratios and in high concentrations so as to form a high ash, such as above 1% by weight ash and preferably above about 2% and up to 10% ash. Greater quantities of mixture of salts of this invention may be used provided the addition does not increase the viscosity of the base lubricant above that generally suitable for equipment requiring fluid lubricants. The percentage ash may be expressed either as percent sulfate ash or percent ash.

Sodium petroleum sulfonate and basic calcium petroleum sulfonate
Sodium petroleum sulfonate and basic barium petroleum sulfonate
Sodium petroleum sulfonate and basic magnesium petroleum sulfonate
Lithium petroleum sulfonate and basic calcium petroleum sulfonate
Sodium diwax benzene sulfonate and basic calcium diwax benzene sulfonate
Potassium petroleum sulfonate and basic calcium diwax benzene sulfonate
Sodium alkylated naphthalene sulfonate and basic alkylated naphthalene sulfonate
Sodium alkylated naphthalene sulfonate and barium petroleum sulfonate
Sodium naphthenate and basic calcium petroleum sulfonate
Calcium octyl phenate and basic calcium petroleum sulfonate
Calcium octyl phenate and basic barium petroleum sulfonate
Calcium octyl phenate sulfide and basic barium petroleum sulfonate
Calcium octyl phenate sulfide and basic barium octyl phenate
Magnesium ditert. butyl phenate and basic calcium ditert. butyl phenate
Sodium ditert. butyl phenate sulfide and basic calcium ditert. butyl phenate sulfide
Calcium salt of octyl phenol-formaldehyde condensation and basic calcium petroleum sulfonate
Calcium salt of octyl phenol-formaldehyde condensation and basic ditert. butyl phenate sulfide
Calcium diisopropyl salicylate and basic barium ditert. butyl phenate sulfide
Sodium petroleum sulfonate and basic calcium diisopropyl salicylate
Sodium naphthenate and basic calcium diisopropyl salicylate
Zinc dioctyl dithiophosphate and basic calcium petroleum sulfonate
Tin phenyl stearate and basic calcium petroleum sulfonate
Aluminum phenyl stearate and basic calcium petroleum sulfonate
Zinc dioctyl dithiophosphate and basic magnesium petroleum sulfonate
Cobalt alkylated benzoate and basic magnesium petroleum sulfonate
Nickel phenyl oleate and basic barium ditert. butyl phenate disulfide
Calcium alkylated succinate and basic calcium petroleum sulfonate
Chromium alkylated malonate and basic calcium diisopropyl salicylate
Strontium ricinoleate and basic calcium petroleum sulfonate Although new and outstanding improved results are obtained by adding to lubricants mixtures of neutral and basic metal detergents in critical proportions and large concentrations so as to form an ash exceeding 1% and preferably from above 2% to 10% ash or sulfate ash, it is desirable under specific lubricating conditions to admix with said highly basic ash-forming mixtures minor amounts of corrosion inhibitors and/or anti-oxidants.

Base oils may be selected from a wide variety of natural oils such as paraffinic, naphthenic and mixed base oils having a wide viscosity range. In addition synthetic oils may be used such as polymerized olefins, copolymers of alkylene glycols and alkylene oxides; organic esters, e. g. 2-ethyl hexyl sebacate, dioctyl phthalate, trioctyl phosphate; polymeric tetrahydrofuran; polyalkyl silicon polymers, e. g. dimethyl silicon polymer, etc. Mixtures of natural and synthetic oils can be used also. Under certain conditions of lubrication minor amounts of a fixed oil such as castor oil, lard oil and the like may be admixed with a hydrocarbon oil and/or with a hydrocarbon oil-synthetic oil mixture.

General formulation of composition of this invention can be represented by:

| | Amount |
|---|---|
| Mixtures of neutral and basic metal organic salts in critical ratio of 2:8 to 4:6, respectively | 1 to 50% ash (2–10% ash) |
| Other additives such as corrosion inhibitors, anti-oxidants, etc. | 0 to 5% wt. (0.1–0.8% wt.) |
| Base lubricant | Balance |

The following table illustrates some of the most preferred lubricating compositions of this invention:

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Sodium petroleum sulfonate and basic calcium petroleum sulfonate | x | | | | | | | x | | x | | | | x |
| Lithium petroleum sulfonate and basic calcium petroleum sulfonate | | | x | | | | | | | | | | | |
| Sodium petroleum sulfonate and basic calcium ditert-butyl phenate | | x | | | | | | | | | | | | |
| Sodium petroleum sulfonate and basic barium ditert-butyl phenate | | | | | | | x | | | | | | x | |
| Sodium petroleum sulfonate and basic barium ditert-butyl sulfide | | | | | | | | x | | | | | | |
| Sodium petroleum sulfonate and basic calcium diisopropyl salicylate | | | | | | | | | | x | | | | |
| Calcium petroleum sulfonate and basic calcium diisopropyl salicylate | | | | | | | x | | | | | | | |
| Barium octyl phenate and basic magnesium petroleum sulfonate | | | | x | | | | | | | | | | |
| Sodium petroleum sulfonate and basic barium petroleum sulfonate | | | | | | x | | | | | | x | | |
| Phenyl alpha-naphthylamine | | | | | | | | | | | x | | x | x |
| Mineral Oil | x | | x | | x | x | | | | x | x | | x | |
| Mineral Oil+alkylated naphthalene | | x | | | | | | x | x | | | x | | |
| Dioctyl sebacate | | | | | | | x | | | | | | | |
| Alkylene oxide-monohydric alcohol condensation product | | | | x | | | | | | | | | | x |

Compositions 1 and 5 as indicated in the above table and in concentration of above about 2% calculated as sulfate ash were tested by the CAT-3A procedure (CRC-L-3-1143) on a 4 cylinder D 4400 Caterpillar engine and the corrosivity and engine deposits were noted as the ratio of the additives in each of the above compositions was varied. Similar compositions were also tested except that the concentration of the additive mixture was maintained at about 0.2% sulfate ash. The results of the tests are shown graphically in Figure II. From the graph it can easily be observed that for the particular combination as noted in compositions 1 and 5 the critical ratio is 1:3 of the neutral to the basic salt respectively, wherein the best engine performance is obtained. It may also be observed that if these additives are in low concentrations they do not behave in the same manner as when used in high ash.

Specific salt mixtures and inhibitors referred to in the above examples were only used for illustrative purposes and are not to be construed as limitations of this invention.

We claim as our invention:

1. A finished mineral lubricating oil composition composed of mineral lubricating oil and from 1% to 10% calculated as sulfate ash, of a mixture of oil-soluble sodium petroleum sulfonate and basic calcium petroleum sufonate, said sulfonates being present in a ratio of 3:7, respectively.

2. A finished mineral lubricating oil composition composed of mineral lubricating oil and from 1% to 10% calculated as sulfate ash, of a mixture of oil-soluble sodium petroleum sulfonate and basic barium petroleum sulfonate, said sulfonates being present in a ratio of 3:7, respectively.

3. A finished mineral lubricating oil composition composed of mineral lubricating oil and from 1% to 10% calculated as sulfate ash, of a mixture of oil-soluble sodium petroleum sulfonate and basic magnesium petroleum sulfonate, said sulfonates being present in a ratio of 3:7, respectively.

4. A finished liquid lubricating composition composed of an organic liquid lubricant and 1% to 10% calculated as sulfate ash, of a mixture of oil-soluble sodium petroleum sulfonate and basic calcium petroleum sulfonate, said sulfonates being present in a ratio of 3:7, respectively.

5. A finished liquid lubricating composition composed of an organic liquid lubricant and 1% to 10% calculated as sulfate ash, of a mixture of oil-soluble sodium petroleum sulfonate and basic barium petroleum sulfonate, said sulfonates being present in a ratio of 3:7, respectively.

6. A finished liquid lubricating composition composed of an organic liquid lubricant and 1% to 10% calculated as sulfate ash, of a mixture of oil-soluble sodium petroleum sulfonate and basic magnesium petroleum sulfonate, said sulfonates being present in a ratio of 3:7, respectively.

7. A finished liquid lubricating composition composed of an organic liquid lubricant and alkali metal salt of a sulfo aromatic hydrocarbon compound and basic alkaline earth metal salt of a sulfo aromatic hydrocarbon compound in ratio of from 2:8 to 4:6, respectively, in amounts exceeding at least 1% and up to about 10% calculated on an ash basis.

8. A finished liquid lubricating composition composed of an organic liquid lubricant and alkali metal salt of an aromatic acidic compound and basic alkaline earth metal salt of an aromatic acidic compound in ratio of from 2:8 to 4:6, respectively, in amounts exceeding at least 1% and up to about 10% calculated on an ash basis.

9. A finished liquid lubricating composition composed of an organic liquid lubricant and alkali metal selected from the group consisting of Na and Li salt of a sulfo aromatic hydrocarbon compound and basic alkaline earth metal selected from the group consisting of Ca, Ba, Mg and Sr salt of a sulfo aromatic hydrocarbon compound in ratio of from 2:8 to 4:6, respectively, in amounts exceeding at least 1% and up to about 10% calculated on an ash basis.

10. A finished liquid lubricating composition composed of an organic liquid lubricant and alkali metal selected from the group consisting of Na and Li salt of an aromatic acidic compound and basic alkaline earth metal selected from the group consisting of Ca, Ba, Mg and Sr salt of an aromatic acidic compound in ratio of from 2:8 to 4:6, respectively, in amounts exceeding at least 1% and up to about 10% calculated on an ash basis.

11. A finished mineral lubricating oil composition composed of mineral lubricating oil and from 1% to 10%, calculated as sulfate ash, of a mixture of an oil-soluble alkali metal petroleum sulfonate and an oil-soluble basic alkaline earth metal petroleum sulfonate, said sulfonates being present in a ratio of from 2:8 to 4:6, respectively.

WALTER GASSER.
PAUL R. VAN ESS.

REFERENCES CITED

The following references are of record in the file of this patent:

UNITED STATES PATENTS

| Number | Name | Date |
|---|---|---|
| 2,401,273 | Reiff | May 28, 1946 |
| 2,412,634 | Schwartz | Dec. 17, 1946 |
| 2,421,004 | Berger | May 27, 1947 |
| 2,442,915 | Berger et al. | June 8, 1948 |